(12) United States Patent
Kingen et al.

(10) Patent No.: US 10,400,981 B1
(45) Date of Patent: Sep. 3, 2019

(54) LIGHTING DEVICE

(71) Applicants: Honda Motor Co., Ltd., Tokyo (JP);
Stanley Electric Co., Ltd., Tokyo (JP)

(72) Inventors: Logan M. Kingen, West Liberty, OH (US); Christopher T. Lepage, Marysville, OH (US); Akira Hongo, Powell, OH (US); Nathan M. Fisher, Dublin, OH (US); Aaron M. Eberle, Dublin, OH (US); Teerawan Grogan, London, OH (US); Robert William Herpy, Columbus, OH (US); William Gerret McWhorter, Columbus, OH (US); Takuya Matsumaru, London, OH (US); Taizo Yokoyama, London, OH (US)

(73) Assignees: Honda Motor Co., Ltd., Tokyo (JP); STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/983,780

(22) Filed: May 18, 2018

(51) Int. Cl.
| | |
|---|---|
| *B60Q 1/36* | (2006.01) |
| *F21S 43/40* | (2018.01) |
| *F21S 43/30* | (2018.01) |
| *F21S 43/235* | (2018.01) |

(52) U.S. Cl.
CPC ............ *F21S 43/40* (2018.01); *F21S 43/235* (2018.01); *F21S 43/30* (2018.01)

(58) Field of Classification Search
CPC .................................................. B60Q 1/0041
USPC ......................................................... 362/511
See application file for complete search history.

(56) References Cited

U.S. PATENT DOCUMENTS

| | | |
|---|---|---|
| 8,545,070 B2 | 10/2013 | Sakiyama et al. |
| 9,033,561 B2 | 5/2015 | Tokieda et al. |
| 9,249,944 B2 | 2/2016 | Noritake et al. |
| 9,457,708 B2 | 10/2016 | Noritake et al. |
| 10,215,360 B1 * | 2/2019 | Grogan ............... F21S 43/249 |
| 2005/0243568 A1 * | 11/2005 | Rodriguez Barros ...... B60Q 1/2665 362/494 |
| 2013/0265791 A1 | 10/2013 | Dassanayake et al. |
| 2014/0160777 A1 | 6/2014 | Mugge |
| 2015/0345731 A1 | 12/2015 | Noritake et al. |
| 2016/0040849 A1 | 2/2016 | Dassanayake et al. |
| 2016/0138773 A1 | 5/2016 | Kawabata |
| 2016/0207446 A1 | 7/2016 | Kumegawa |

* cited by examiner

*Primary Examiner* — Christopher M Raabe
(74) *Attorney, Agent, or Firm* — Rankin, Hill & Clark LLP

(57) ABSTRACT

A lighting device for a vehicle includes a first lighting part arranged on a stationary body part of the vehicle, and a second lighting part arranged on a movable body part of the vehicle. A gap in a vehicle width direction is provided between the first lighting part and the second lighting part. The first lighting part includes a first reflector and the second lighting part includes a second reflector. The first reflector is located forward of the second reflector in a vehicle forward-rearward direction, and the gap is rearward of the first reflector in the vehicle forward-rearward direction. The second reflector is inclined toward one of the first reflector and the gap.

30 Claims, 9 Drawing Sheets

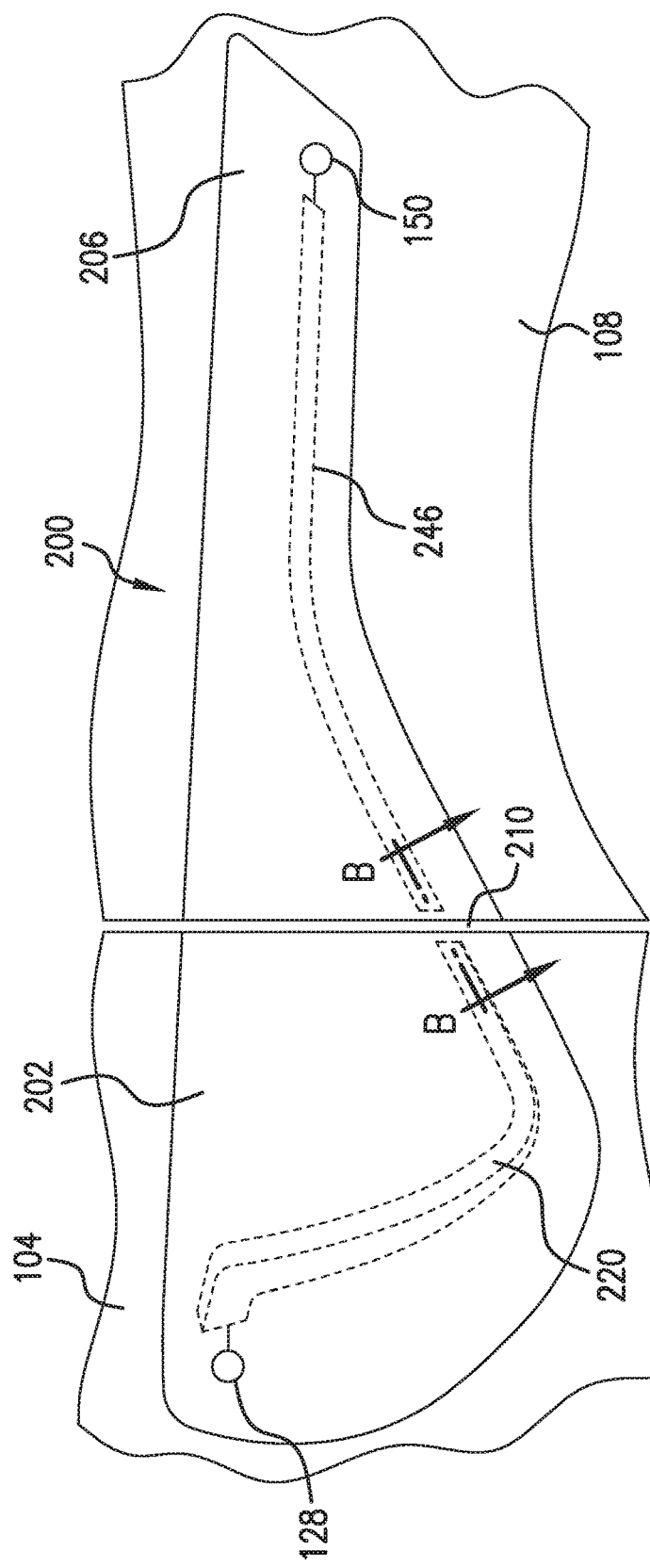

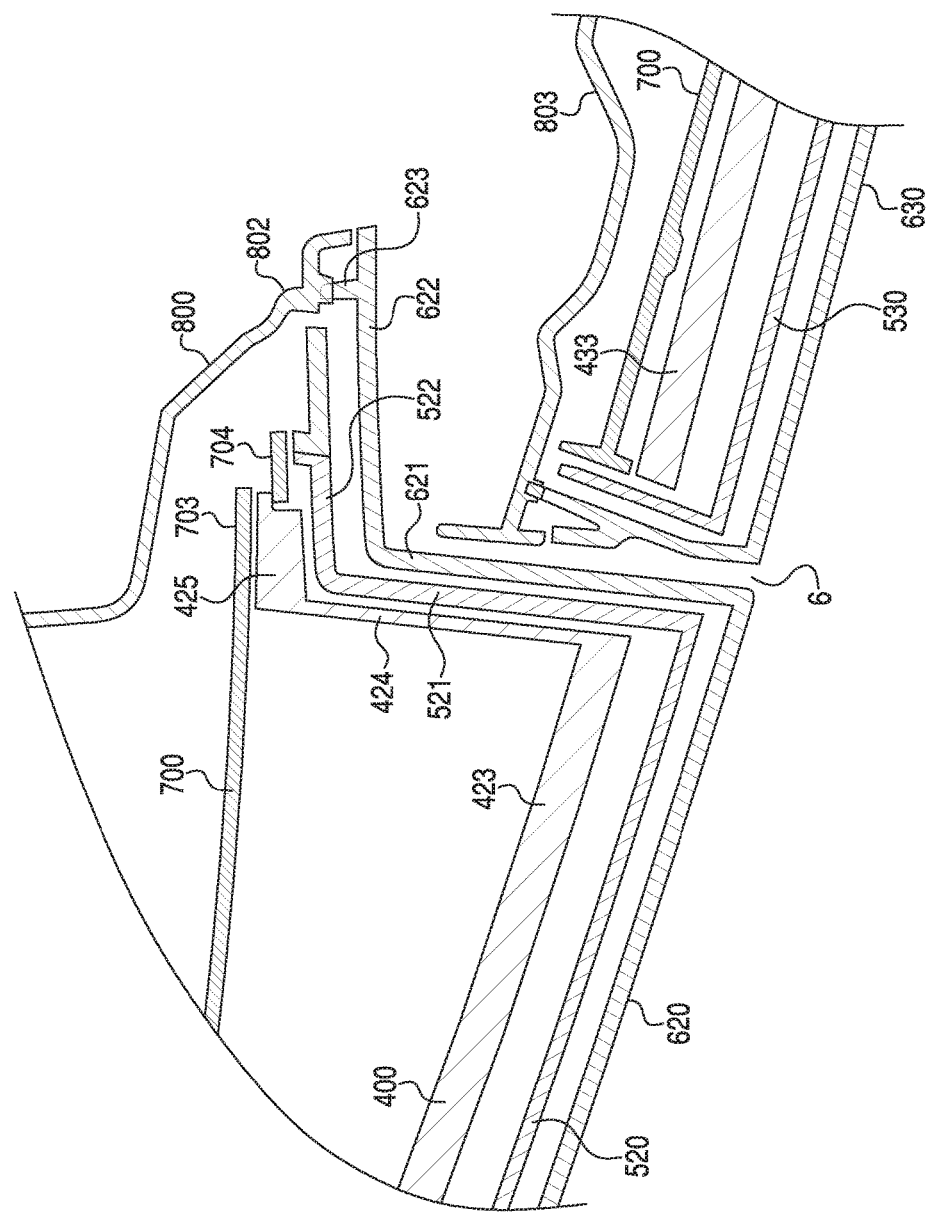

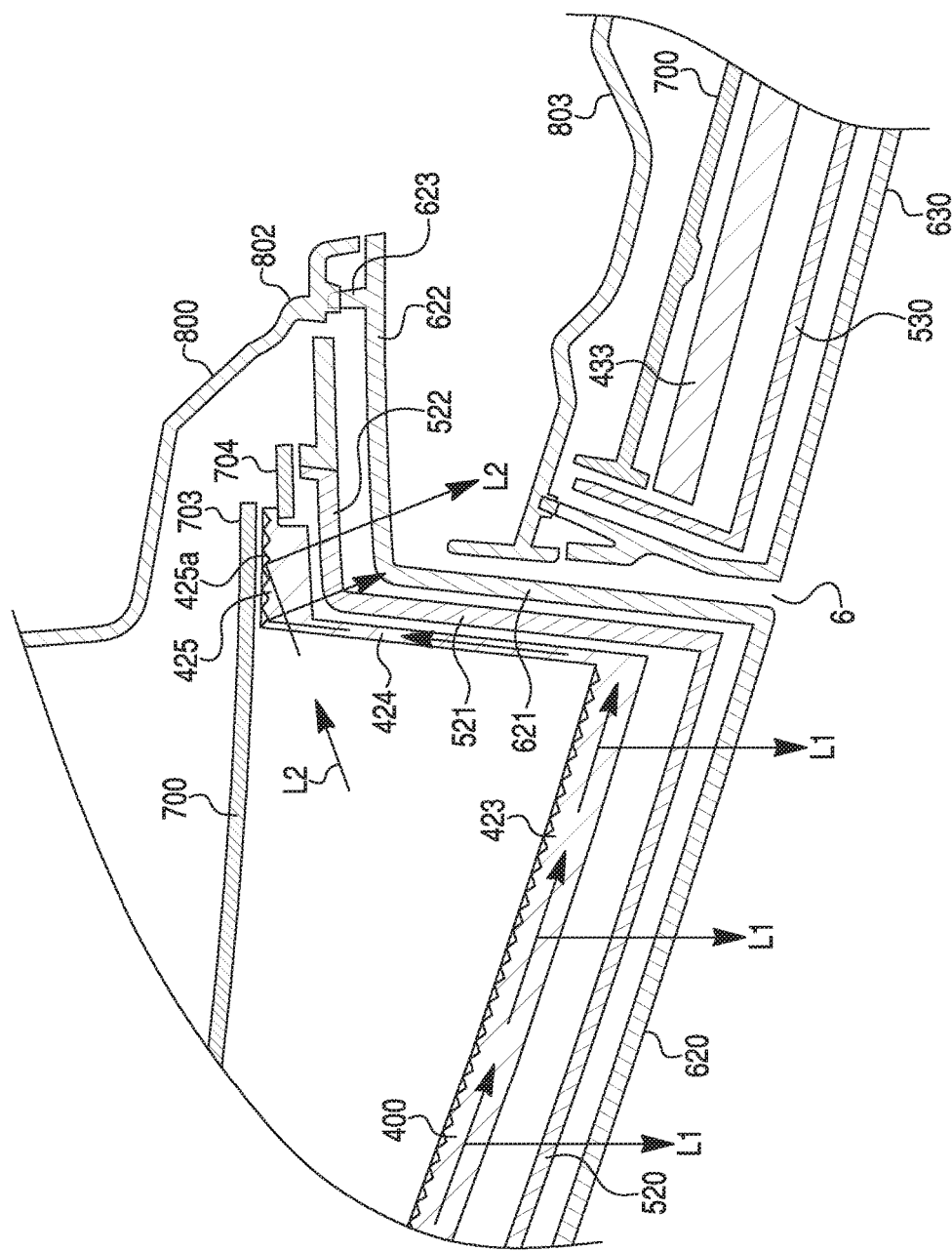

LIGHTING DEVICE

BACKGROUND

Rear combination lamps may have two parts, a stationary lamp part that is mounted to a vehicle body panel and a movable lamp part that is mounted to a vehicle door panel. With such a lighting device the movable lamp part requires a clearance from the stationary lamp part for opening of the door panel. This clearance creates a gap in a vehicle width direction between the two lamp parts. Because the gap is not luminous, an integral feel of the rear combination lamp can be insufficient.

BRIEF DESCRIPTION

According to one aspect, a lighting device for a vehicle comprises a first lighting part arranged on a stationary body part of the vehicle, and a second lighting part arranged on a movable body part of the vehicle. A gap in a vehicle width direction is provided between the first lighting part and the second lighting part. The first lighting part includes a first reflector and the second lighting part includes a second reflector. The first reflector is located forward of the second reflector in a vehicle forward-rearward direction, and the gap is rearward of the first reflector in the vehicle forward-rearward direction. The second reflector is inclined toward one of the first reflector and the gap.

According to another aspect, a lighting device for a vehicle comprises a first lighting part arranged on a stationary body part of the vehicle, and a second lighting part arranged on a movable body part of the vehicle. A gap in a vehicle width direction is provided between the first lighting part and the second lighting part. The first lighting part includes a first light guide and the second lighting part includes a second light guide. The first light guide is located forward of the second light guide in a vehicle forward-rearward direction, and the gap is rearward of the first light guide in the vehicle forward-rearward direction. The second light guide is inclined toward one of the first light guide and the gap.

According to another aspect, a lighting device for a vehicle comprises a first lighting part arranged on a stationary body part of the vehicle, and a second lighting part arranged on a movable body part of the vehicle. A gap in a vehicle width direction is provided between the first lighting part and the second lighting part. The first lighting part includes a first reflector and a first light guide. The second lighting part includes a second reflector and a second light guide. The first reflector is located forward of the second reflector in a vehicle forward-rearward direction, and the gap is rearward of the first reflector in the vehicle forward-rearward direction. The first reflector extends toward the second lighting part, and an end portion of the first reflector intersects with the gap in the vehicle forward-rearward direction. The second reflector is inclined toward one of the first reflector and the gap. The first reflector is adapted to reflect light from one of the first light guide and the second light guide through the gap, wherein the gap is illuminated by the reflected light.

According to another aspect, a structure to illuminate a gap between two vehicle lamps located adjacent to each other, can include a first lamp having an outer lens including an outer lens folded part, an inner lens located inward of the outer lens. The inner lens can include an inner lens folded part folding inward from a lateral end of the inner lens. A second lamp can include an end located adjacent the outer lens folded part to form the gap between the outer lens folded part and the second lamp, wherein the first lamp includes a light guide body located inward relative to the inner lens folded part. The light guide body can be configured to direct light from a first light source. The light guide body can include a first part having lens cuts configured as a total reflection surface, and a light emitting surface located on an inner lens side of the first part facing the inner lens. The lens cuts can be configured to reflect light from the first light source towards the light emitting surface within the light guide body, such that light emitted from the light emitting surface illuminates at least a portion of the outer lens folded part and the gap.

BRIEF DESCRIPTION OF THE DRAWINGS

FIG. 4 is a schematic view of a lighting device for a vehicle according to another aspect of the present disclosure.

FIG. 10 is a close-up of the top cross-sectional view of FIG. 9.

FIG. 11 is a close-up top cross-sectional view of another embodiment of a vehicle lighting device.

DETAILED DESCRIPTION

Figure 1:
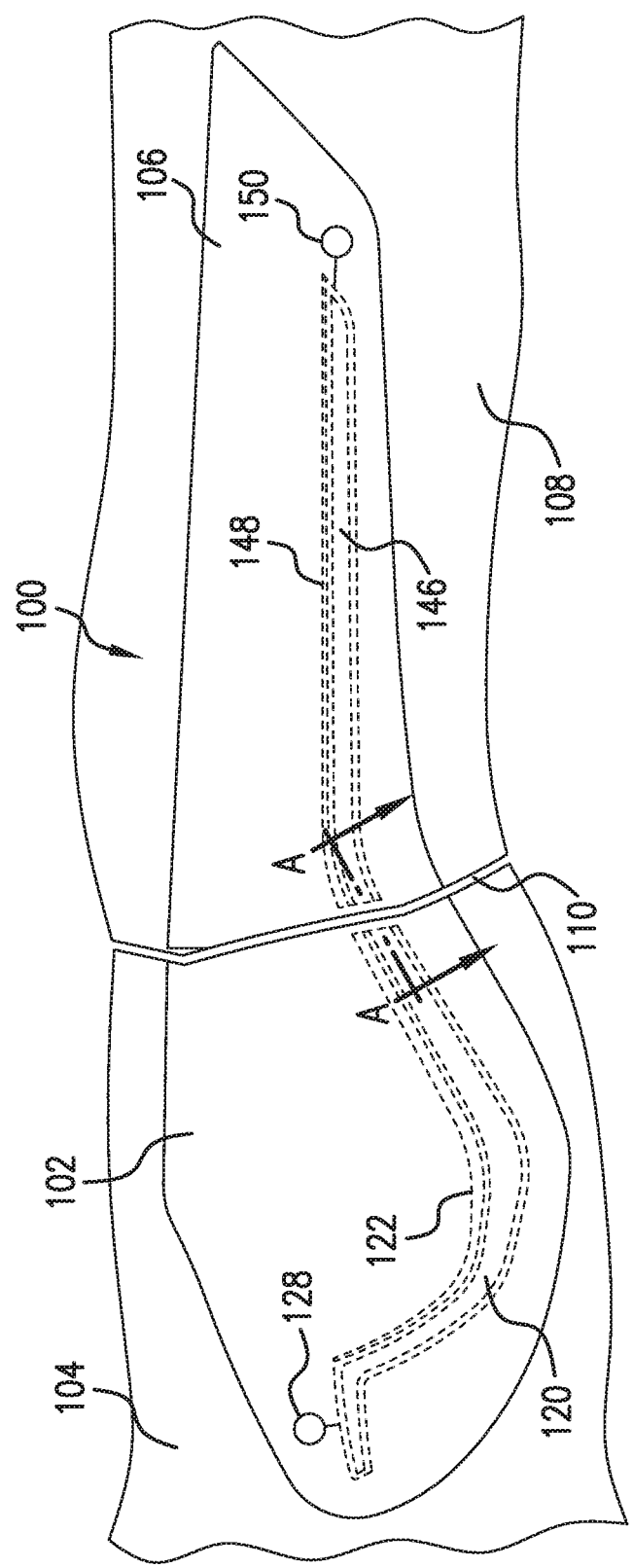
FIG. 1 is a schematic view of a lighting device for a vehicle according to one aspect of the present disclosure.
Figure 3:
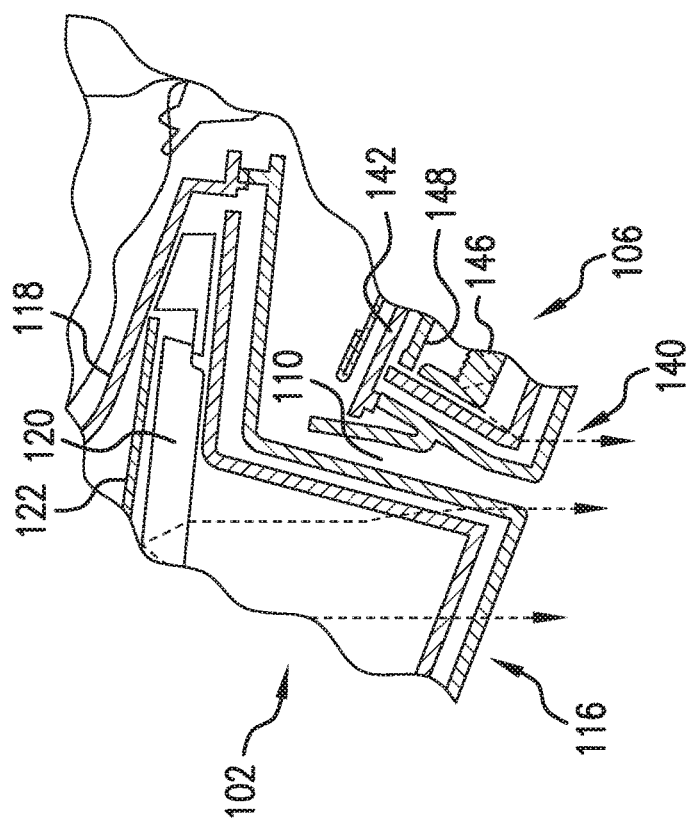
FIGS. 2 and 3 are partial cross-sectional views taken along line A-A of the lighting device of FIG. 1, with FIG. 3 further depicting a light pattern of the lighting device.
Figure 2:
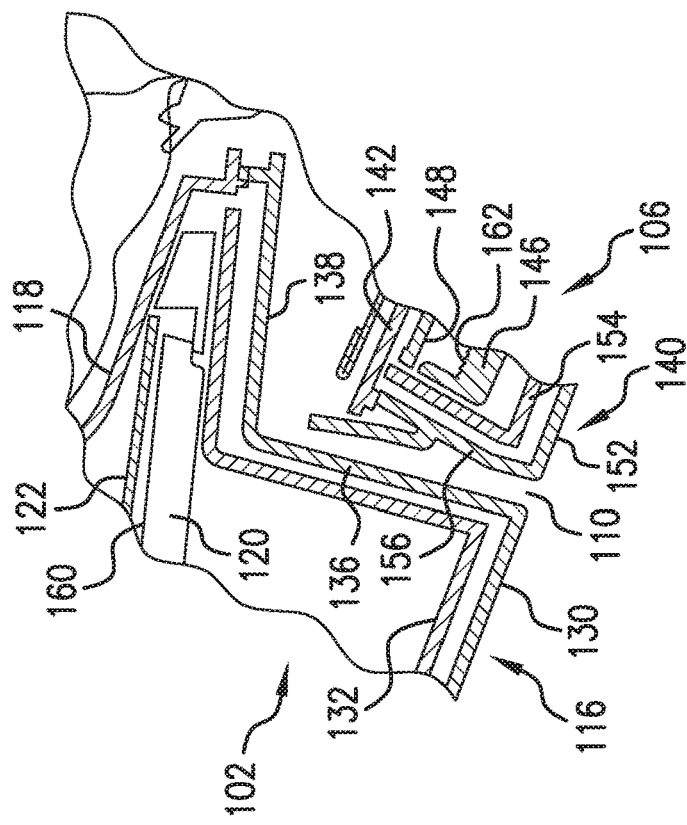

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-3 schematically illustrate a lighting device 100 for a vehicle according to one aspect of the present disclosure. The lighting device 100 includes a first lighting part 102 arranged on a stationary body part 104 of the vehicle and a second lighting part 106 arranged on a movable body part 108 of the vehicle. A gap 110 in a vehicle width direction is provided between the first lighting part 102 and the second lighting part 106. In the depicted embodiment, the lighting device 100 is a taillight device, and the first lighting part 102 is a tail light section that can be mounted on, for example, a rear quarter panel and the second lighting part 106 is a separate lid light section that can be mounted on, for example, a tailgate or trunk lid.

The first lighting part 102 includes a first lens 116, which can form part of the exterior of the vehicle, mounted to a first housing 118. The first lighting part 102 further includes a first light guide 120 and a first reflector 122 located forward of the first light guide 120 in a vehicle forward-rearward direction. A first light source 128 housed in the first lighting part 102 illuminates the first light guide 120. Further, as shown in FIGS. 2 and 3, the first lens 116 can include an outer lens portion 130 and an inner lens portion 132 adapted to project light from the first light guide 120 into a predetermined pattern. The outer lens portion 130 includes a sidewall 136 extending in the vehicle forward-rearward direction and an end wall 138 extending in the vehicle width direction. The sidewall 136 at least partially defines the gap 110, and both the first light guide 120 and the first reflector 122 extend in the vehicle width direction toward the second lighting part 106. According to one aspect, both the first light guide 120 and the first reflector 122 extend past the sidewall 136 in the vehicle width direction, partially along the end wall 138, and into the gap 110. Accordingly, end portions of the first light guide 120 and the first reflector 122 intersect with the 110 gap in the vehicle forward-rearward direction.

Similarly, the second lighting part 106 includes a second lens 140, which can form part of the exterior of the vehicle, mounted to a second housing 142. The second lighting part 106 further includes a second light guide 146 and a second reflector 148 located forward of the second light guide 146 in the vehicle forward-rearward direction. A second light source 150 housed in the second lighting part 106 illuminates the second light guide 146. As depicted in FIGS. 2 and 3, the second lens 140 can include an outer lens portion 152 and an inner lens portion 154 adapted to project light from the second light guide 146 into a predetermined pattern. The outer lens portion 152 includes a sidewall 156 extending in the vehicle forward-rearward direction. The sidewall 156 at least partially defines the gap 110. Further, both the second light guide 146 and the second reflector 148 are spaced in the vehicle width direction from the sidewall 156, and are inclined toward one of the first reflector 122 and the gap 110.

It should be appreciated that each of the first housing 118 and the second housing 142 is generally made of a plastic material, but can be made of any suitable material. Similarly, each of the first lens 116 and the second lens 140 is generally made of a plastic material. However, it should be understood that each of the first lens 116 and the second lens 140 can be made of any suitable transparent material, including glass. Additionally, each of the first lens 116 and the second lens 140 may have varying levels of transparency, such as different color pigmentation level, or different level of neutral density filter, etc. For example, portions of each of the first lens 116 and the second lens 140 may be entirely transparent while other portions may be less transparent. Also, opaque portions can be added to the transparent portion so as to stylize the lighting device 100.

With continued reference to FIGS. 2 and 3, it should be appreciated that a side 160 of the first light guide 120 facing the first reflector 122 and a side 162 of the second light guide 146 facing the second reflector 148 can each include a plurality of prisms (i.e., molded in optics) arrayed generally along its length. When light is provided to each of the first light guide 120 and the second light guide 146, the prisms interfere with the natural path of the light through each of the first light guide 120 and the second light guide 146, and this interference causes the light to reflect in a direction toward each of the first lens 116 and the second lens 140. According to the present disclosure, the first light guide 120 and the first reflector 122 extend past the first lens 116 in the vehicle width direction and into the gap 110 forward in the vehicle forward-rearward direction of the second lighting part 106. And with the location of the first light guide 120 and the first reflector 122 relative to the gap 110, the first reflector 122 is adapted to reflect light from the first light guide 120 directly through the gap 110. And with the inclined second light guide 146 and the inclined second reflector 148, the second reflector 148 is adapted to reflect light from the second light guide 146 towards the gap 110. Thus, the gap 110 is illuminated by the reflected light. This illumination of the gap 110 provides an integral feel for the vehicle light device 100 having the separate first and second lighting parts 102, 106.

It should also be appreciated that each of the first and second light sources 128, 150 can include at least one light emitting diode (LED) which is mounted on an operating support secured in the respective first and second housings 118, 142. However, the each of the first and second light sources 128, 150 may be an incandescent light source(s), a fluorescent light source(s), a high intensity discharge ("HID"), or any light source suitable for providing light to the respective first and second light guides 120, 146. Each operating support can be in the form of a printed circuit board (PCB).

Figure 6:
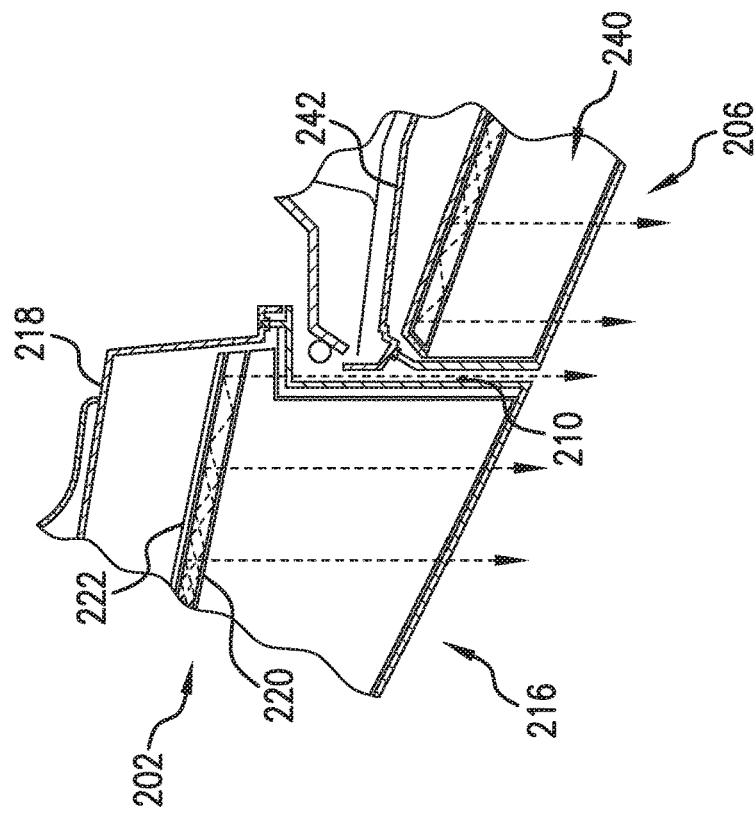
FIGS. 5 and 6 are partial cross-sectional views taken along line B-B of the lighting device of FIG. 4, with FIG. 6 further depicting a light pattern of the lighting device.
Figure 5:
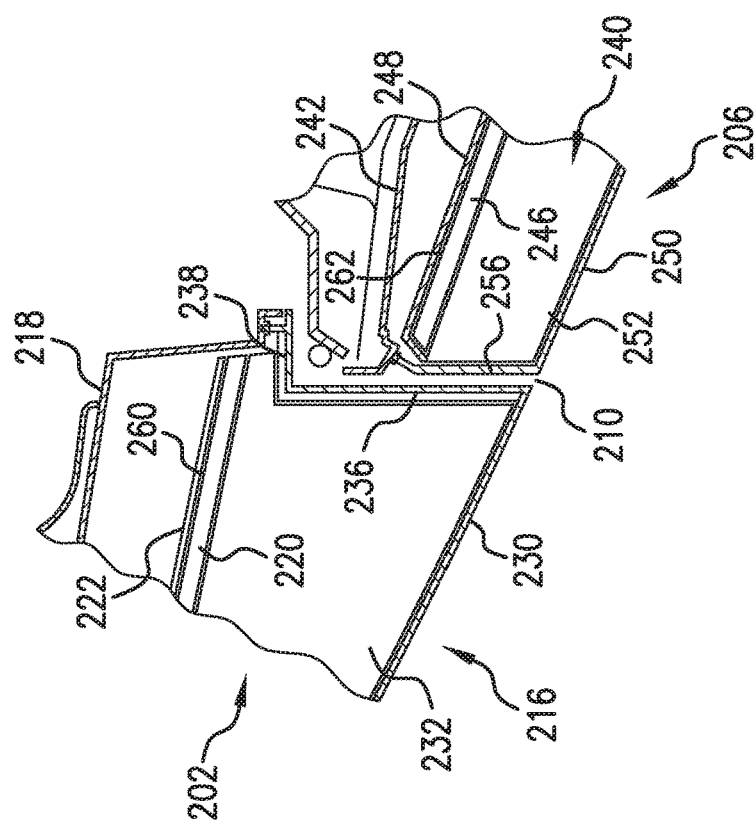

FIGS. 4-6 schematically illustrate a lighting device 200 for a vehicle according to another aspect of the present disclosure. The lighting device 200 includes a first lighting part 202 arranged on the stationary body part 104 of the vehicle and a second lighting part 206 arranged on the movable body part 108 of the vehicle. A gap 210 in a vehicle width direction is provided between the first lighting part 102 and the second lighting part 206.

The first lighting part 202 includes a first lens 216 mounted to a first housing 218. The first lighting part 202 further includes a first light guide 220 and a first reflector 222 located forward of the first light guide 220 in a vehicle forward-rearward direction. The first light source 128 housed in the first lighting part 202 illuminates the first light guide 220. Again, the first lens 216 can include an outer lens portion 230 and an inner lens portion 232 adapted to project light from the first light guide 220 into a predetermined pattern. The outer lens portion 230 includes a sidewall 236 extending in the vehicle forward-rearward direction and an end wall 238 extending in the vehicle width direction. The sidewall 236 at least partially defines the gap 210, and both the first light guide 220 and the first reflector 222 extend in the vehicle width direction toward the second lighting part 206. According to one aspect, both the first light guide 220 and the first reflector 222 extend past the sidewall 236 in the vehicle width direction, partially along the end wall 238, and into the gap 210.

Similarly, the second lighting part 206 includes a second lens 240 mounted to a second housing 242. The second lighting part 206 further includes a second light guide 246 and a second reflector 248 located forward of the second light guide 246 in the vehicle forward-rearward direction. As depicted, the second reflector 248 can be configured to extend around an end portion of the second light guide 246. The second light source 150 housed in the second lighting part 206 illuminates the second light guide 246. Similar to the second lens 140, the second lens 240 can include an outer lens portion 250 and an inner lens portion 252 adapted to project light from the second light guide 246 into a predetermined pattern. The outer lens portion 250 includes a sidewall 256 extending in the vehicle forward-rearward direction. The sidewall 256 at least partially defines the gap 210. Further, both the second light guide 246 and the second reflector 248 are spaced in the vehicle width direction from the sidewall 256, and are inclined toward one of the first reflector 222 and the gap 210.

Figure 7:
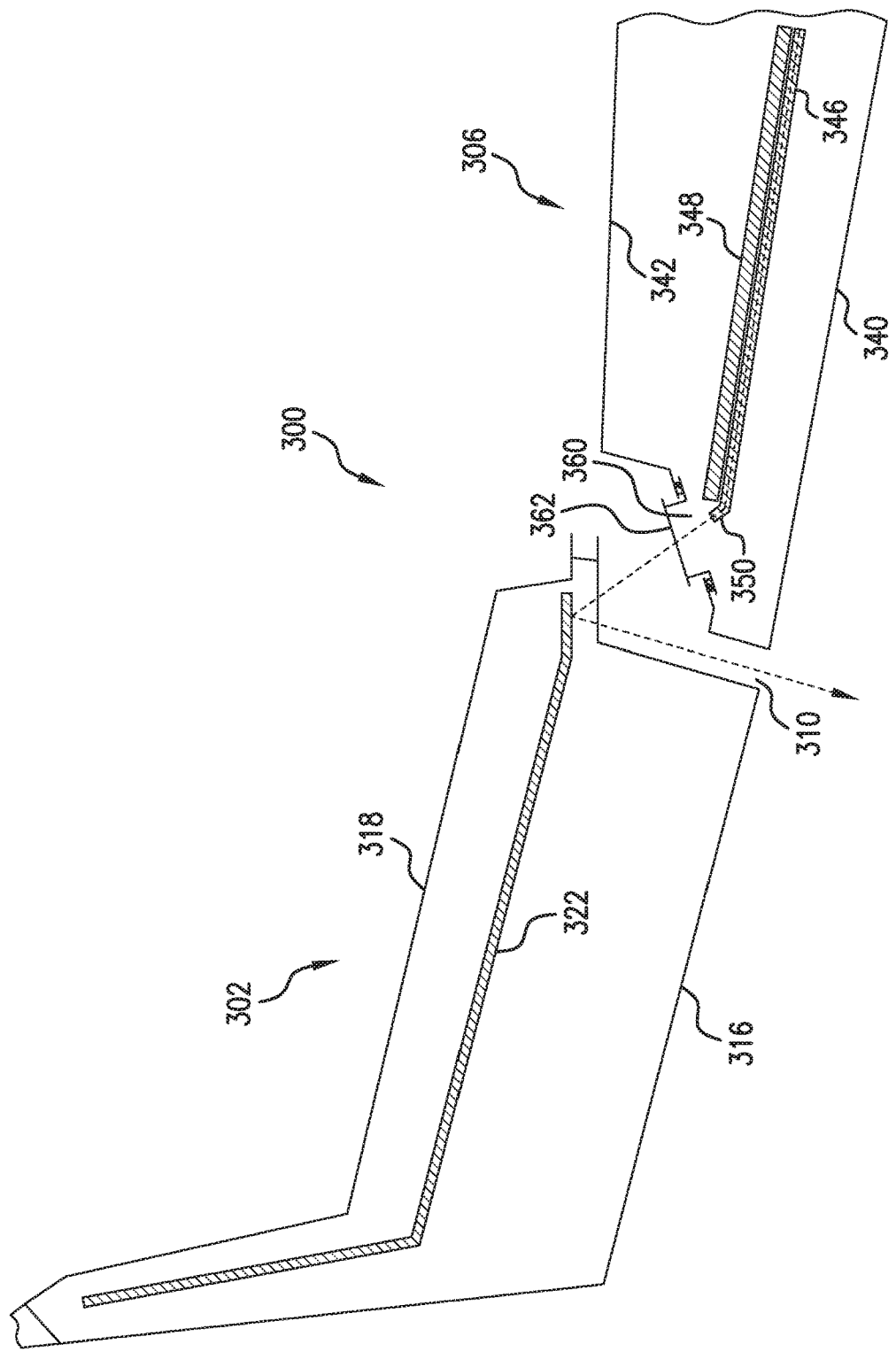
FIGS. 7 and 8 are schematic cross-sectional views of a lighting device for a vehicle according to yet another aspect of the present disclosure.
Figure 8:
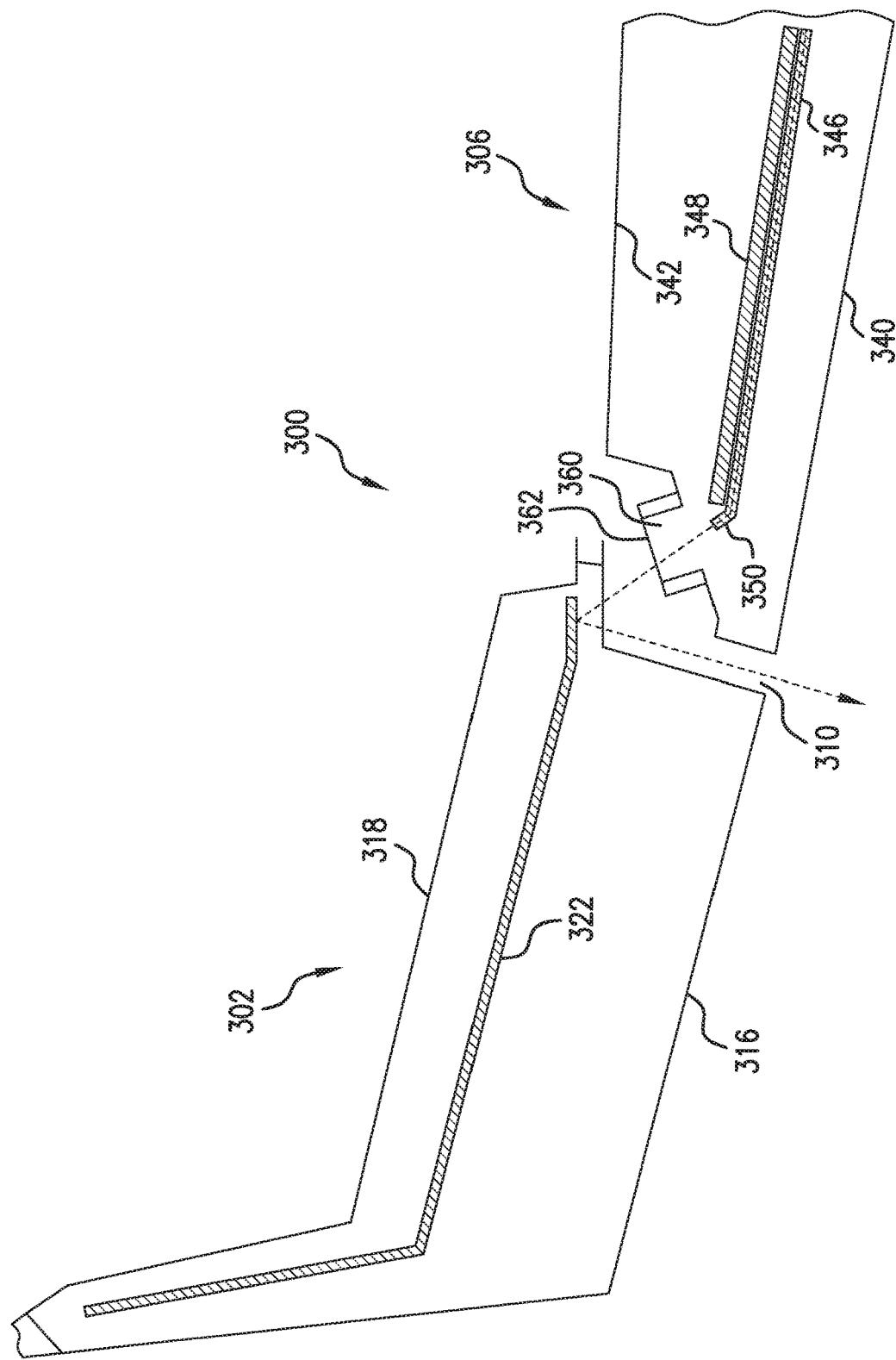

With continued reference to FIGS. 5 and 6, it should be appreciated that a side 260 of the first light guide 220 facing the first reflector 222 and a side 262 of the second light guide 246 facing the second reflector 248 can each include a plurality of prisms (i.e., molded in optics) arrayed generally along its length. When light is provided to each of the first light guide 220 and the second light guide 246, the prisms interfere with the natural path of the light through each of the first light guide 220 and the second light guide 246, and this interference causes the light to reflect in a direction toward each of the first lens 216 and the second lens 240. According to the present disclosure, the first light guide 220 and the first reflector 222 extend past the first lens 216 in the vehicle width direction and into the gap 210 forward in the vehicle forward-rearward direction of the second lighting part 206. And with the location of the first light guide 220 and the first reflector 222 relative to the gap 210, the first reflector 222 is adapted to reflect light from the first light guide 220 directly through the gap 210, wherein the gap 210 is illuminated by the reflected light. And with the inclined second light guide 246 and the inclined second reflector 248, the second reflector 248 is adapted to reflect light from the second light guide 246 towards the gap 220, wherein the gap 210 is illuminated by the reflected light. This illumination of the gap 210 provides an integral feel for the vehicle lighting device 200 having the separate first and second lighting parts 202, 206, FIGS. 7 and 8 schematically illustrate a lighting device 300 for a vehicle according to another aspect of the present disclosure. The lighting device 300 includes a first lighting part 302 arranged on the stationary body part 104 of the vehicle and a second lighting part 306 arranged on the movable body part 108 of the vehicle. A gap 310 in a vehicle width direction is provided between the first lighting part 102 and the second lighting part 206. The first lighting part 302 includes a first lens 316, which can form part of the exterior of the vehicle, mounted to a first housing 318. The first lighting part 302 further includes a first light guide (not depicted) and a first reflector 322 located forward of the first light guide 320 in a vehicle forward-rearward direction. An end portion of the first reflector 322 intersects with the 310 gap in the vehicle forward-rearward direction. The second lighting part 306 includes a second lens 340, which can form part of the exterior of the vehicle, mounted to a second housing 342. The second lighting part 306 further includes a second light guide 346 and a second reflector 348 located forward of the second light guide 346 in the vehicle forward-rearward direction. Both the second light guide 346 and the second reflector 348 are inclined toward one of the first reflector 322 and the gap 310.

The second light guide 346 is configured to direct light toward the first lens 316 and the first reflector 322. The first reflector 322 is adapted to reflect the light through the gap 310. The gap 310 is illuminated by the reflected light, thereby providing an integral feel for the vehicle lighting device 300 having the separate first and second lighting parts 302, 306. As depicted, an end portion 350 of the second light guide 346 is canted toward the first reflector 322. The second housing 342 includes an opening 360. A cap 362 formed of a transparent material is secured to the second housing 342 and covers the opening 360. The second light guide 346 is configured to direct light toward the cap 362 and the first reflector 322.

As is evident from the foregoing, the lighting device 100, 200, 300 positions the first lighting part 102, 202, 302 forward of the second lighting part 106, 206, 306 in the vehicle forward-rearward direction. The first and second lighting parts of the light device 100, 200, 300 are aligned when the movable body part 108 of the vehicle is in the fully closed position. In the full closed position with the lighting device 100, 200, 300 illuminated the lit appearance of the lighting device 100, 200, 300 will be the same from the first lighting part 102, 202, 302 through the gap 110, 210, 310 to the second lighting part 106, 206, 306, creating one continuous lit image from a rear view of the vehicle.

Figure 9:
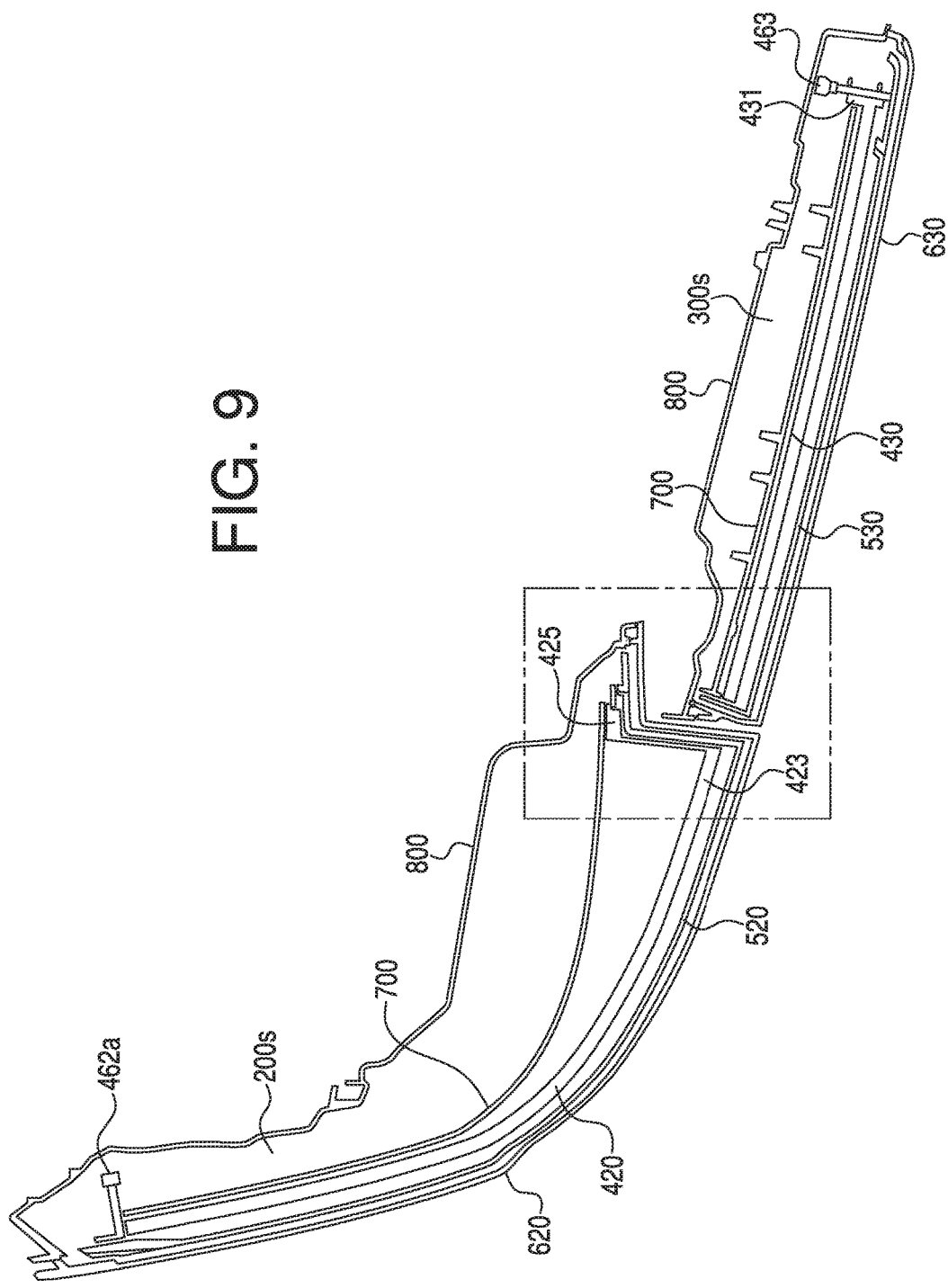
FIG. 9 is a top cross-sectional view of another embodiment of a vehicle lighting device made in accordance with principles of the disclosed subject matter.

FIG. 9 is a top cross-sectional view of another embodiment of a vehicle light assembly made in accordance with principles of the disclosed subject matter. In this view, the general shape and extent of the light guide 400 (see FIG. 10) can be seen in detail. The folded portion (located at the joinder between portions 423 and 424 of the light guide 400) allows the light guide 400 to closely follow the outer perimeter of the vehicle body as it wraps around from the side of the vehicle to a rear of the vehicle.

In this view, the layered structure of the different lens surfaces and light guide body are apparent. In particular, in the first lamp portion 200s, the outer lens 620 is shown extending across a front of the lamp portion 200s and immediately in front of first inner lens 520, which in turn is located in front of the light guide first portion 420. Each of the outer lens 620, inner lens 520, and light guide body first portion 420 can closely follow each other (with regard to shape) along their longitudinal axes. In this embodiment, the top cross-section shows the outer lens 620, inner lens 520, and light guide body first portion 420 all extending from an outermost longitudinal end of the first lamp portion towards the gap 6 in an arched manner. Once the outer lens 620, inner lens 520, and light guide body first portion 420 reach the dotted-line box portion in FIG. 9, each of these structures includes two folded portions or bend portions that make each of these structures appear as a "reverse Z" shape from the top cross-sectional view shown in FIG. 9. After the outer lens 620, inner lens 520, and light guide body first portion 420 make their first fold, these structures then run in an inward direction towards an interior of the lamp 200s. At this inward run location, the outer lens 620 forms an exterior wall that, with various portions of the second lamp portion 300s, defines the gap 6 between the first lamp portion 200s and second lamp portion 300s. Also, at this inward run location, the light guide first portion is defined by an inward extension portion 424 that is relatively straight and extends perpendicularly (perpendicular or substantially perpendicular) with respect to a lateral axis of a gap end extension portion 423 of the light guide body first portion 420. Then, after the second fold, the light guide body first portion 420 extends away in a lateral direction to form an intermediate gap light extension portion 425. The intermediate gap light extension portion 425 can extend perpendicularly with respect to the inward extension portion 424. The first lamp portion 200s is sealed by a housing 800 that connects to the outer lens 620 around a perimeter of the outer lens 620. A reflector 700 can be located within the housing 800 and behind all of the light guide body first portion 420, inner lens 520, and the outer lens 620, relative to a light emitting direction of the first lamp portion 200s. The reflector 700 can be configured to run along, or mimic the shape of the light guide body first portion 420 while being set back a short distance from the light guide body first portion 420.

The second lamp portion 300s can include an outer lens 630, an inner lens 530, and a light guide second portion 430. In this embodiment, the light guide second portion 430 is configured as a substantially straight (straight or almost straight), but possibly arched, single piece structure. The second end light source 463 can be located at a second end 431 of the light guide second portion 430 to direct light along the extent of the light guide second portion 430. The reflector 700 can run along and extend behind the light guide second portion 430 in order to ensure light is directed out of the lamp 300.

The reflector 700 can include two single continuous structures with no openings therein, and can include a first portion spaced a substantial distance from a rear of the light guide first portion 420, and a second portion running closely behind the light guide second portion 430. The light guide first portion 420 can include a gap extension portion 423 leading up to the first fold portion and an inward extension portion 424 extending perpendicularly with respect to the inward extension portion 424 from the first fold portion to the second fold portion. An intermediate gap light extension portion 425 can then extend from the second fold portion to an outermost lateral end of the light guide first portion 420. Thus, light from a first end light source 462a will travel in a "reverse Z" shape along light guide first portion 420 from one end to an opposite end, where the intermediate gap light extension portion 425 will be illuminated by the light that has travelled through the longitudinal extent of the light guide first portion 420 from the first end light source 462a. The illumination of the intermediate gap light extension portion 425 will allow the light guide 400 to appear as a single continuous band of light when viewed form a location exterior to the vehicle lamp device.

In this embodiment, housing 800 can connect to an outer lens 620 of the first lamp portion 200s and can create a space that contains light guide first portion 420 and inner lens first portion 520. This view shows the light guide first portion 420 and inner lens first portion 520 closely following and shaped similar to the outer lens first portion 620.

In the second lamp portion 300s, the housing 800 can connect to an outer lens 630 and can create a space that contains light guide second portion 430 and inner lens first portion 530. This view shows the light guide first portion 430 and inner lens first portion 530 closely following and shaped similar to the outer lens first portion 630. In the second lamp portion 300s, a second end light source 463 can be provided at a second distal end 431 of the light guide second portion 430. As shown in FIG. 10, light from the second light source 463 can travel along a longitudinal axis of the light guide second portion 430 to a gap end extension portion 433 located immediately adjacent the gap 6 formed between the first lamp portion 200s and second lamp portion 300s.

FIG. 10 is a close-up of the top cross-sectional view of FIG. 9 and shows in better detail the relationship between the structures described above with respect to FIG. 9. In particular, the reflector 700 first portion can be a single continuous structure with no opening therein. The reflector can be spaced a substantial distance from a rear of the light guide first portion 420 (in particular, behind and spaced from the gap extension portion 423 and then behind close to the intermediate gap light extension portion 425). Thus, the first end light source 462a travels through the light body first portion 420 along the gap extension portion 423, inward along the inward extension portion 424, and ending at the intermediate gap light extension portion 425 to be the sole cause for illumination of the intermediate gap light extension portion 425. The intermediate gap light extension portion 425 is set back from the outermost surface of the outer lens 620 and inner lens 520 by the inward extension portion 424 such that the intermediate gap light extension portion 425 is located in a position to illuminate the gap 6 from deep within the light device. The reflector 700 can include an attachment portion 704 for connecting and stabilizing the intermediate gap light extension portion 425 of the light guide 400. The inner lens first portion 520 can include a gap inward extension portion 521 that mimics and follows closely to the shape of the light guide inward extension portion 424. Likewise, the outer lens first portion 620 can include a gap inward extension portion 621 that mimics and follows closely to the shape of both the gap inward extension portion 521 and the light guide inward extension portion 424. In addition, the inner lens first portion 520 can include a gap continuance end portion 522, and the outer lens first portion 620 can include a gap continuance end portion 622 that both mimic and follow the shape of the intermediate gap light extension portion 425. Thus, the outer lens first portion 620, the inner lens first portion 520, and the light guide 400 form a sandwich shape in a reverse Z shape, at a location immediately adjacent the gap 6 and the second lamp portion 300. The housing 800 includes a first end gap connection 802 that is configured to attach to an attachment extension 623 extending from the outer lens first portion 620 to seal the first lamp portion 200s. An inward extension 703 of the first portion of reflector 700 can be located immediately behind the intermediate gap light extension portion 425 to assist in directing light towards the gap 6 via the intermediate gap light extension portion 425, the inner lens gap continuance end portion 522, and outer lens gap continuance end portion 622.

The second lamp portion 300s can include a gap continuance end portion 803 of the housing 800 that connects to the outer lens 630 to seal the second lamp portion 300s. The gap continuance end portion 803 of the housing 800 can either be opaque, or can be transparent if desired to allow light therethrough to further illuminate the gap 6.

FIG. 11 is a close-up of a top cross-sectional view (similar to that taken in FIG. 10) of another embodiment of the lighting device 1. In FIG. 11, the light guide 400 can include lens cuts 425a located at an inner surface of both the intermediate gap light extension portion 425 and the gap extension portion 423. The lens cuts 425a cause light L1 that travels along the light body 400 to exit in an outward direction (rearward direction out of the rear of the vehicle when configured as a tail lamp), at the gap extension portion 423 of the light guide 400. A portion of light L1 that does not get reflected outward by lens cuts 425a at gap extension portion 423 will then travel inward along the inward extension portion 425 to the intermediate gap light extension portion 425 and will then be reflected outwards towards gap 6 via the lens cuts 425a in the inner surface of the intermediate gap light extension portion 425.

In addition, with further regard to the intermediate gap light extension portion 425, the light L2 that travels within the housing of the vehicle light (and does not enter the light guide body 400 at a distal end thereof) and is incident on a side face of the intermediate gap light extension portion 425 will also be reflected by the lens cuts 425a and directed outwardly along arrow L2 to illuminate the gap 6 located between the first lamp portion 200s and second lamp portion 300s.

Other than lens cuts 425a, the first and second lamp portions 200s, 300s can be configured similar to the embodiment shown in FIG. 10. Of course, various structures from each of the disclosed embodiments can be interchanged with similar elements from other disclosed embodiments without departing from the scope of the invention. Thus, only particular portions (or none of) the light guide first portion 420 (or second portion 430) can include lens cuts, such as prism cuts or diffusion cuts, etc.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A lighting device for a vehicle comprising:
   a first lighting part arranged on a stationary body part of the vehicle;
   a second lighting part arranged on a movable body part of the vehicle; and
   a gap in a vehicle width direction between the first lighting part and the second lighting part;
   wherein the first lighting part includes a first reflector and the second lighting part includes a second reflector, the first reflector located forward of the second reflector in a vehicle forward-rearward direction, and the gap is rearward of the first reflector in the vehicle forward-rearward direction,
   wherein the second reflector is inclined toward one of the first reflector and the gap.

2. The vehicle lamp of claim 1, wherein the first lighting part includes a first light guide and the second lighting part includes a second light guide, the first light guide is located forward of the second light guide in the vehicle forward-rearward direction and the gap is rearward of the first light guide in the vehicle forward-rearward direction.

3. The vehicle lamp of claim 2, wherein the second light guide is inclined toward one of the first light guide and the gap.

4. The vehicle lamp of claim 2, wherein the first lighting part includes a first lens, and the first light guide extends in the vehicle width direction past the first lens toward the second lighting part and into the gap forward of the second lighting part in the vehicle forward-rearward direction.

5. The vehicle lamp of claim 4, wherein the first lens has a sidewall which partially defines the gap, the first lighting part extends past the sidewall of the first lens.

6. The vehicle lamp of claim 2, wherein the first lighting part includes a first housing and a first lens mounted to the first housing, and the second light guide is configured to direct light toward the first lens and the first reflector, the first reflector is adapted to reflect the light through the gap, wherein the gap is illuminated by the reflected light.

7. The vehicle lamp of claim 6, wherein an end portion of the second light guide is canted toward the first reflector.

8. The vehicle lamp of claim 6, wherein the second lighting part includes a second housing and a second lens mounted to the second housing, the second housing including an opening, and further including a cap formed of a transparent material secured to the second housing and covering the opening, the second light guide is configured to direct light toward the cap.

9. The vehicle lamp of claim 2, wherein the first reflector is adapted to reflect light from one of the first light guide and the second light guide through the gap, wherein the gap is illuminated by the reflected light.

10. The vehicle lamp of claim 1, wherein first reflector extends toward the second lighting part, and an end portion of the first reflector intersects with the gap in the vehicle forward-rearward direction.

11. A lighting device for a vehicle comprising:
    a first lighting part arranged on a stationary body part of the vehicle;
    a second lighting part arranged on a movable body part of the vehicle; and
    a gap in a vehicle width direction between the first lighting part and the second lighting part;
    wherein the first lighting part includes a first light guide and the second lighting part includes a second light guide, the first light guide located forward of the second light guide in a vehicle forward-rearward direction, and the gap is rearward of the first light guide in the vehicle forward-rearward direction,
    wherein the second light guide is inclined toward one of the first light guide and the gap.

12. The vehicle lamp of claim 11, wherein the first lighting part includes a first reflector and the second lighting part includes a second reflector, the first reflector is located forward of the second reflector in the vehicle forward-rearward direction and the gap is rearward of the first reflector in the vehicle forward-rearward direction.

13. The vehicle lamp of claim 12, wherein the second reflector is inclined toward one of the first reflector and the gap.

14. The vehicle lamp of claim 12, wherein the first lighting part includes a first housing and a first lens mounted to the first housing, and the second light guide is configured to direct light toward the first lens and the first reflector, the first reflector is adapted to reflect the light through the gap, wherein the gap is illuminated by the reflected light.

15. The vehicle lamp of claim 14, wherein the second lighting part includes a second housing and a second lens mounted to the second housing, the second housing including an opening, and further including a cap formed of a transparent material secured to the second housing and covering the opening, the second light guide is configured to direct light toward the cap.

16. The vehicle lamp of claim 12, wherein the first reflector is adapted to reflect light from the first light guide through the gap, wherein the gap is illuminated by the reflected light.

17. The vehicle lamp of claim 11, wherein the first lighting part includes a first lens having a sidewall which partially defines the gap, and the first light guide extends in the vehicle width direction past the sidewall toward the second lighting part and into the gap forward of the second lighting part in the vehicle forward-rearward direction.

18. A lighting device for a vehicle comprising:
    a first lighting part arranged on a stationary body part of the vehicle, the first lighting part includes a first reflector and a first light guide;
    a second lighting part arranged on a movable body part of the vehicle, the second lighting part includes a second reflector and a second light guide; and
    a gap in a vehicle width direction between the first lighting part and the second lighting part;
    wherein the first reflector is located forward of the second reflector in a vehicle forward-rearward direction, and the gap is rearward of the first reflector in the vehicle forward-rearward direction,
    wherein the first reflector extends toward the second lighting part, and an end portion of the first reflector intersects with the gap in the vehicle forward-rearward direction
    wherein the second reflector is inclined toward one of the first reflector and the gap, and
    wherein the first reflector is adapted to reflect light from one of the first light guide and the second light guide through the gap, wherein the gap is illuminated by the reflected light.

19. The vehicle lamp of claim 18, wherein the first lighting part includes a first lens having a sidewall which partially defines the gap, and the first light guide extends in the vehicle width direction past the sidewall toward the second lighting part and into the gap forward of the second lighting part in the vehicle forward-rearward direction, wherein the first reflector is adapted to reflect light from the first light guide through the gap.

20. The vehicle lamp of claim 18, wherein the first lighting part includes a first housing and a first lens mounted to the first housing, the second lighting part includes a second housing and a second lens mounted to the second housing, the second housing including an opening and a cap formed of a transparent material secured to the second housing and covering the opening, wherein the second light guide is configured to direct light toward the cap and the first reflector, the first reflector is adapted to reflect the light through the gap.

21. A structure to illuminate a gap between two vehicle lamps located adjacent to each other, comprising:

a first lamp including,
   an outer lens including an outer lens folded part,
   an inner lens located inward of the outer lens and including an inner lens folded part folding inward from an outer lateral end of the inner lens; and
a second lamp including an end located adjacent the outer lens folded part to form the gap between the outer lens folded part and the second lamp, wherein
the first lamp includes a light guide body located inward relative to the inner lens folded part, the light guide body configured to direct light from a first light source, the light guide body including a first part having lens cuts configured as a total reflection surface, and a light emitting surface located on an inner lens side of the first part facing the inner lens, and the lens cuts are configured to reflect light from the first light source towards the light emitting surface within the light guide body, such that light emitted from the light emitting surface illuminates at least a portion of the outer lens folded part and the gap.

22. The structure of claim 21 further comprising:
a reflector located inward relative to the light guide body.

23. The structure of claim 21, wherein the light guide body further includes a second part, the second part extends away in a lateral direction from a point adjacent to the inner lens folded part.

24. The structure of claim 23, wherein the light guide body second part and the light guide body first part are both formed as one integral unit.

25. The structure of claim 23, wherein the light guide body includes a connecting part that connects the light guide body first part to the light guide body second part.

26. The structure of claim 23, wherein the light guide body second part radiates light for at least one function of the first lamp including at least one of a brake lamp function and a tail light function.

27. The structure of claim 21, wherein the lens cuts are prismatic cuts.

28. The structure of claim 21, wherein the first lamp is a rear combination lamp and the second lamp is a trunk lid lamp.

29. The structure of claim 21, wherein the light guide body further includes a second part extending away in a lateral direction to an outer lateral end, and a connecting part that extends from and connects an inner lateral end of the light guide body second part to the light guide body first part, the connecting part extends in an inward direction away from the inner lateral end of the light guide body second part to the light guide body first part.

30. The structure of claim 29, wherein the first light source is an end light source located at the outer lateral end of the light guide body.

* * * * *